United States Patent [19]

Hiramatsu et al.

[11] 4,019,036

[45] Apr. 19, 1977

[54] METHOD FOR THE RATIONAL APPLICATION OF PATTERNING SIGNALS TO A PATTERNING DEVICE, TOOLS ADAPTED TO PRODUCE A PATTERN AND AN APPARATUS FOR CARRYING OUT THE SAME

[75] Inventors: Takashi Hiramatsu; Akihiko Oe; Atsushi Fukuda; Masaki Fuse; Tatsujiro Mori, all of Nagoya, Japan

[73] Assignee: Mitsubishi Rayon Co., Ltd., Tokyo, Japan

[22] Filed: Dec. 11, 1974

[21] Appl. No.: 531,701

[30] Foreign Application Priority Data

Aug. 30, 1974  Japan .................................. 49-99615

[52] U.S. Cl. ........................ 235/151.1; 178/DIG. 6; 234/2; 234/131; 66/154 R
[51] Int. Cl.² ........................................... D04B 15/78
[58] Field of Search ................ 340/172.5, 324 AD; 178/DIG. 6; 234/2, 3, 18, 73, 93; 235/151.1; 66/154 R, 154 A

[56] References Cited

UNITED STATES PATENTS

| | | |
|---|---|---|
| 3,637,997 | 1/1972 | Petersen ..................... 178/DIG. 6 |
| 3,660,597 | 5/1972 | Stock ................................. 358/80 |
| 3,786,987 | 1/1974 | Nishikawa et al. ..................... 234/2 |
| 3,821,468 | 6/1974 | Busch ........................... 178/DIG. 6 |
| 3,835,245 | 9/1974 | Pieters ........................... 178/DIG. 6 |

OTHER PUBLICATIONS

"Response System" in *Electronics in Knitting* by Arazi pp. 87-99.

*Primary Examiner*—Eugene G. Botz
*Attorney, Agent, or Firm*—Armstrong, Nikaido & Marmelstein

[57] ABSTRACT

The present invention discloses a method and apparatus for applying patterning signals to electric patterning devices. Firstly, first electric signals are obtained from an object on which the original pattern is based and is displayed on a display means. Second electric signals are also displayed on said display means for defining an area of said selected pattern. The first and second signals are monitored so that said first signals can be corrected, if necessary. Third electrical signals are obtained corresponding to a portion of the first signal to be selected, and the patterning device and tools are controlled by said third electrical signals.

11 Claims, 25 Drawing Figures

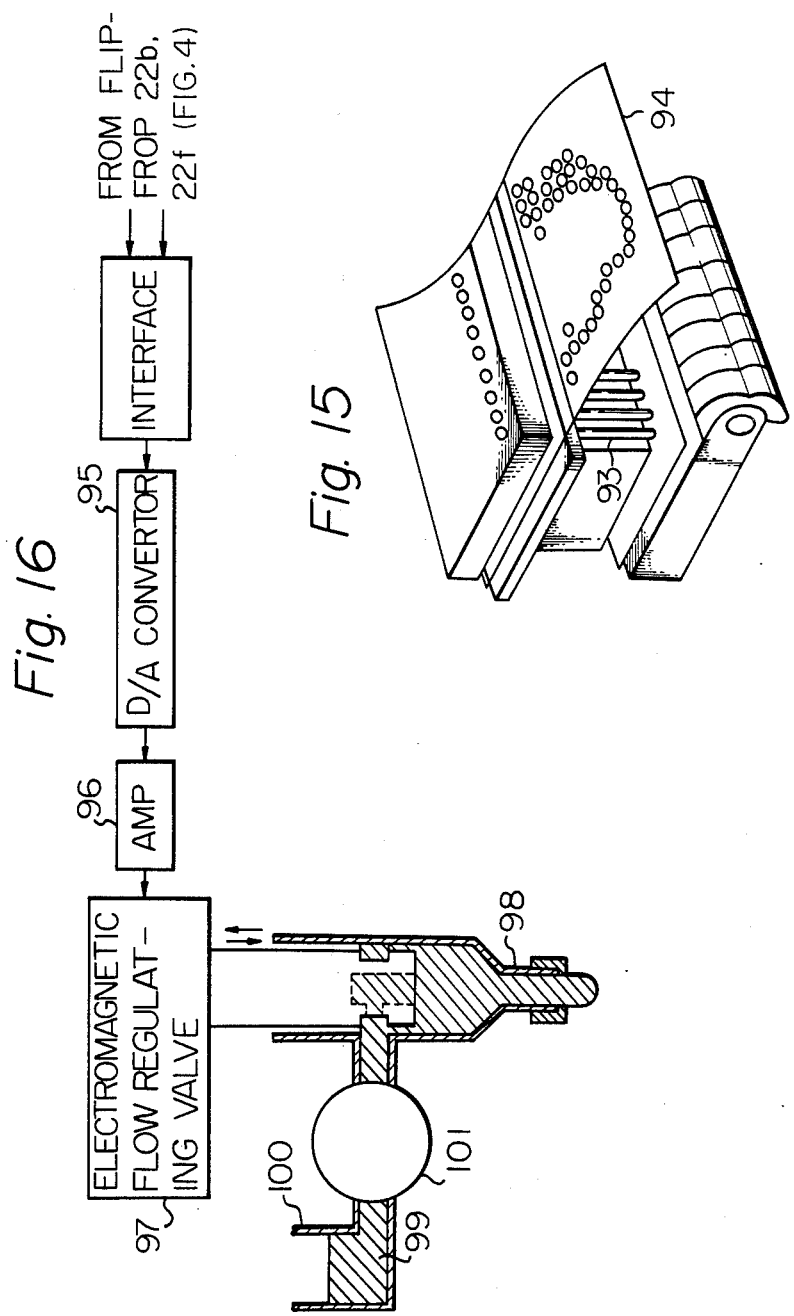

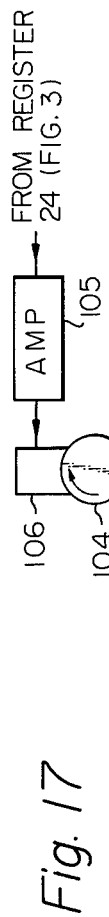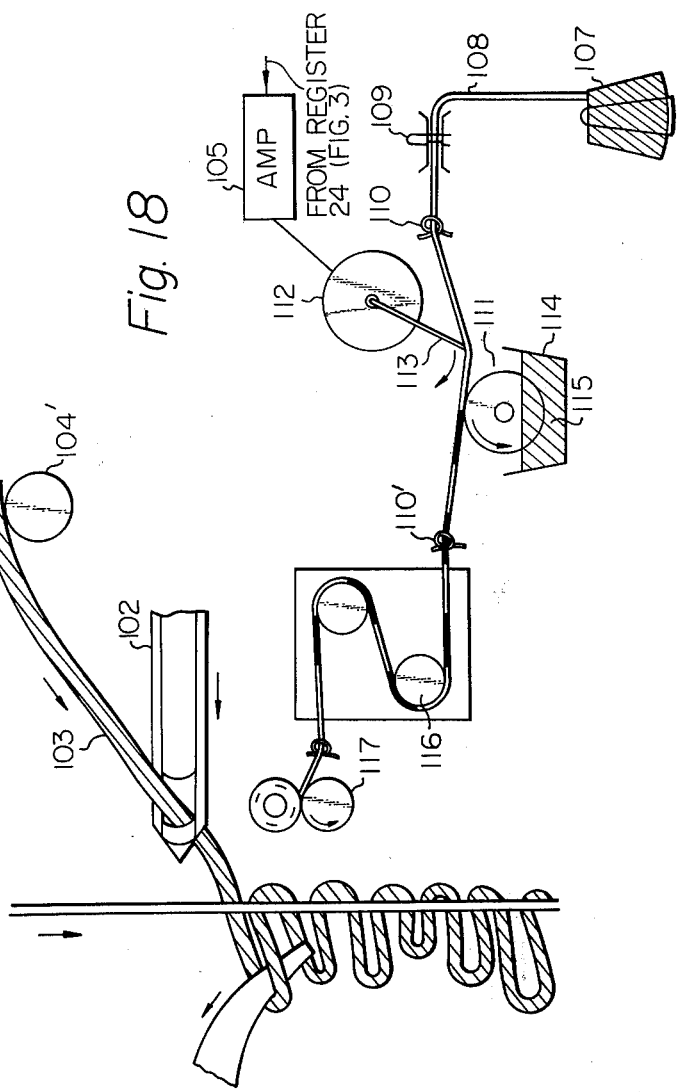

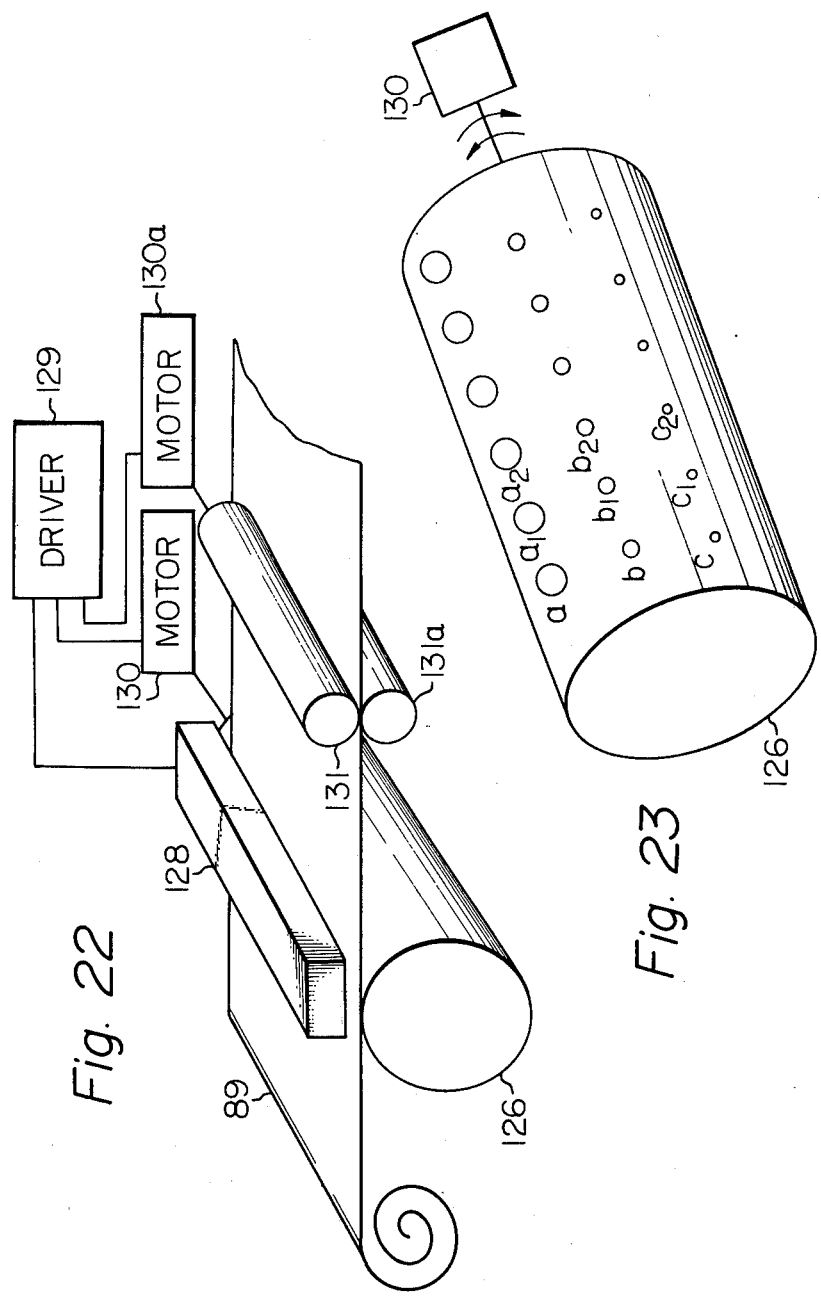

METHOD FOR THE RATIONAL APPLICATION OF PATTERNING SIGNALS TO A PATTERNING DEVICE, TOOLS ADAPTED TO PRODUCE A PATTERN AND AN APPARATUS FOR CARRYING OUT THE SAME

DETAILED EXPLANATION OF THE INVENTION

The present invention relates to a method and a device for the rational application of pattern information signals to patterning devices, which produce a pattern on various articles.

The term referred to herein as "articles" generally includes various patterned products or materials such as cloth, yarn, paper or film sheets which are used to make clothing, carpets, curtains, wall paper, furniture and so on.

The term referred to herein as "pattern" includes a pattern appearing on Jacquard woven goods, Jacquard knitted goods and dobby woven goods; a pattern appearing on textile goods by a printing method; a pattern made by supplementing colored thread, such as in embroidery; and a pattern made by an embossing treatment or which appears on "high-and-low" carpet goods i.e. having piles of different heights or piles with different contours.

The term referred to herein as "patterning devices" which includes jacquard looms, jacquard knitting machines, dobby looms, high-and-low tuffing machines and so on, and also includes not only machines adapted to be directly driven by electric pattern information signals but also machines adapted to be driven by pattern information signals stored by mechanical means such as a lag, a pattern wheel, a pattern drum, a pattern disc, a slat and a tape or the like. Machines of the latter type may possess, means for generating these mechanical pattern information signals, such as a jacquard device by a pattern wheel, an auto-setter for the pattern wheel used in circular knitting, an automatic pattern puncher, for making a pattern card used in jacquard weaving, or a punching machine adapted to provide an NC control tape in an NC control embroiderery machine.

As will be understood from the aforegoing description, the object of the present invention is to provide an automatically adapted pattern information signal for the rapid and efficient production of an intended pattern. The present invention will now be described in more detail with respect to a specific application thereof.

To achieve said object, machines such as a pattern analyzer and a photo-scanner have often been used for jacquard knitting and weaving. A pattern of knitted or woven goods is made by using a needle selector mechanism or by using a code format or a pattern information signal according to the required pattern so that said fabric has a plurality of different colored raised yarns.

The pattern information required in a case such as this, comprises a series of information assemblies arranged in a predetermined order, each assembly being encoded with respect to the color arrangement within a pattern, expressed as each intersecting point of warp and weft for woven goods, or as each stitch for knitted goods. Such pattern information is stored in various forms such as perforated tape for NC control including paper tape, steel tape, or Mylar tape; optical film; magnetic memories including computers; pattern wheels; pattern drums or pattern discs, by which the machines are controlled.

Said pattern analyzer or photo-scanner is used to automatically obtain rapid and efficient pattern information as mentioned above. To achieve this, however, prior to the knitting or weaving, the operator must prepare a design sheet of the intended pattern on which the colors have been arranged with regard to each stitch of knitted goods or each intersecting point of yarn within woven goods so that this design sheet may be optically and automatically read out by a device havng a principle similar to that of a facsimile. Such a method is disadvantageous because too much time and labor are necessary for the preparation of said design sheet. Several attempts have been made to overcome this disadvantage resulting in, for example, an improved pattern analyzer which uses a poster, a photograph and so on instead of a grid pattern paper as the design sheet, or a digitalizer which needs only the outline of a pattern which can be manually traced making it unnecessary to provide a complete pattern. Both of the above two examples have already been put to practical use as pattern input means.

However, if the original is a poster of a photograph, for example, instead of a design on paper, there are three factors which must be determined before the outline of the pattern can be executed.

Said three factors to be determined are (1) how many colors the original contains; (2) what part of the original must be read out; and (3) how many points must be read out from this area. These factors were conventionally determined by the designer when preparing the design plan, although in the case of a device which does not require said design plan, these factors were mechanically determined and read out. However, for a case such as this, no method has been available to check the read out condition at any given time. In connection with this prior art, therefore, such checking had to be carried out, by displaying said original on a CRT display with the help of a computer, after said factors were determined and were read out (i.e. printed) by typewriter.

When using such a monitoring method, however, if the result from the initial check proved to be unsatisfactory, the operator had to repeat the operation. One of the objects of the present invention is to eliminate such repetition.

This object can be effectively achieved, in accordance with the present invention, by a method comprising four basic steps consisting of (1) obtaining first electric signals from an object on which the original pattern is based, such as a human figure, a landscape, a still life, a poster or a photograph, in a form which is displayed on a display means; (2) obtaining second electric signals also in said form displayed on a display means which correspond to a line which defines a specific part of the selected pattern, or to a group of lines corresponding to the selected stitches or intersecting points in woven material, or a combination thereof; (3) modifying said first signals while being monitored by said second signals so that said first signals can be corrected, if necessary; and (4) obtaining a third signal which is the corrected first signal obtained from the relationship between said first and second signals in the previous steps.

This method permits the designer to constantly monitor the process and the result of any necessary corrections with reference to the above-mentioned three factors on the display means, thereby simplifying the process of the creation of a design.

Although display means of various types may be used with the present invention, means consisting of on-line systems suitable for immediate display are preferable. Examples are a CRT display, a plasma display, or a liquid crystal display, although said CRT display is most preferable because of its popularity and relatively low cost. Either an expensive graphic display having many devices as CRT displays or a common television set may be employed. As means for obtaining said signals to be displayed on said display means, a television camera, a facsimile, or a self-scanning solid-state camera or a photodiode array used as a special type television camera (e.g., an image sensor manufactured by Reticon Corporation or Fairchild Semiconductor Corporation) may be used. The television camera including the above kind of image sensor is the most preferable, particularly when a CRT display is used as the display means.

Use of a television camera as the read-out means produces the following further advantages. (1) A larger variety of objects can be used as the original.

The television camera can display a larger variety of objects such as a landscape, a still life, cloth, a poster, a photograph, and so on, as the original. Even a three-dimensional object which has heretofor had to be excluded can be used as the original. Furthermore, there is no size limit to the original since it can be either enlarged or scaled down. (2) Both reading and displaying can be rapidly accomplished. Input from the television to the display means can be effected immediately.

Although the foregoing description has been directed toward the fields of jacquard knitting and weaving, the object of the present invention is not limited to these fields. The method according to the present invention may also be effectively used as a monitoring method. For example, an image caught by said television camera can be transferred to a hard copying device using electric discharge destruction paper. In such a case, the original need not be limited to a minimum of pattern units, nor need be digitalized in accordance with shading tonality. In addition, any continuous signals in one direction may be used. Therefore, it is sufficient to provide only a frame signal as said second signal, especially in the printing field.

When, for example, a nozzle adapted to spray printing liquid is provided with an electromagnetic valve so that the amount of said printing liquid to be sprayed depends upon the level of input voltage applied to said valve which causes said nozzle to move in X and Y directions while following the design plan, the corrected third signals according to the method of the present invention can be used as said voltage signals which are applied to said electromagnetic valve in order to obtain the desired pattern. Since the execution of ay pattern requires any one of, a combination of or all of said three factors in order to provide a pattern in any field, the present invention has an extremely wide range of application.

The foregoing and other objects, features and advantages of the invention will be apparent from the following more particular description of preferred embodiments of the invention, as illustrated in the accompanying drawings.

FIGS. 13 – 16 are embodiments wherein the present invention is applied to the printing industry;

FIG. 17 is an embodiment wherein the present invention is applied to the manufacture of "high and low" carpets;

FIG. 18 is an embodiment wherein the present invention is applied to the space dyeing industry;

FIGS. 22 – 24 are embodiments wherein the present invention is applied to embossing finishing.

Figure 1:
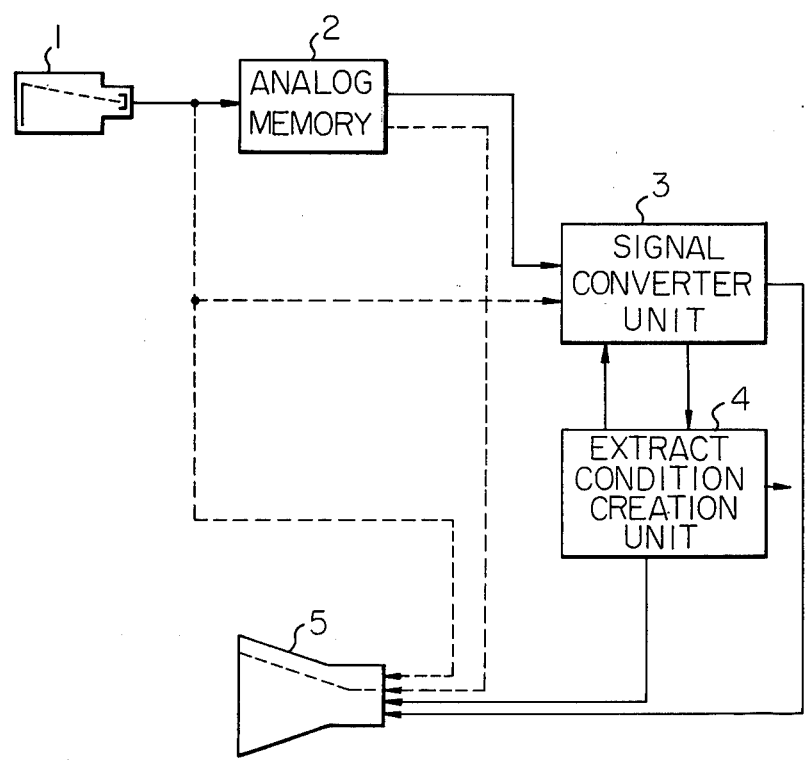
FIG. 1 is an embodiment of a fundamental construction of the present invention.

Referring to FIG. 1, the construction of the present invention is composed of a television camera 1 which reads the pattern information of the original figure, an analogue memory 2 which stores information corresponding to one field of the analogue video signal output of said television camera 1, a signal converter unit 3 which converts the output of said analogue memory 2 into a suitable signal for an output unit which will be described later, (for example, a digital signal or a coded signal), an extract condition creation unit 4 wherein the operator selects the output of the signal converter unit 3 and sends out said selected output, and a display unit 5 which superimposes and displays the outputs from said television camera, said analogue memory, said signal converter unit and said extract condition creation unit, respectively. In FIG. 1, the paths shown by the dotted lines can be selected by the operator in accordance with the kind of output unit used. That is, the operator, while observing the display unit 5, operates the signal conversion unit 3 and the extract condition creation unit 5 and can execute the pattern design.

Next, we will explain the various embodiment of the present invention.

Embodiment 1

Figure 2:
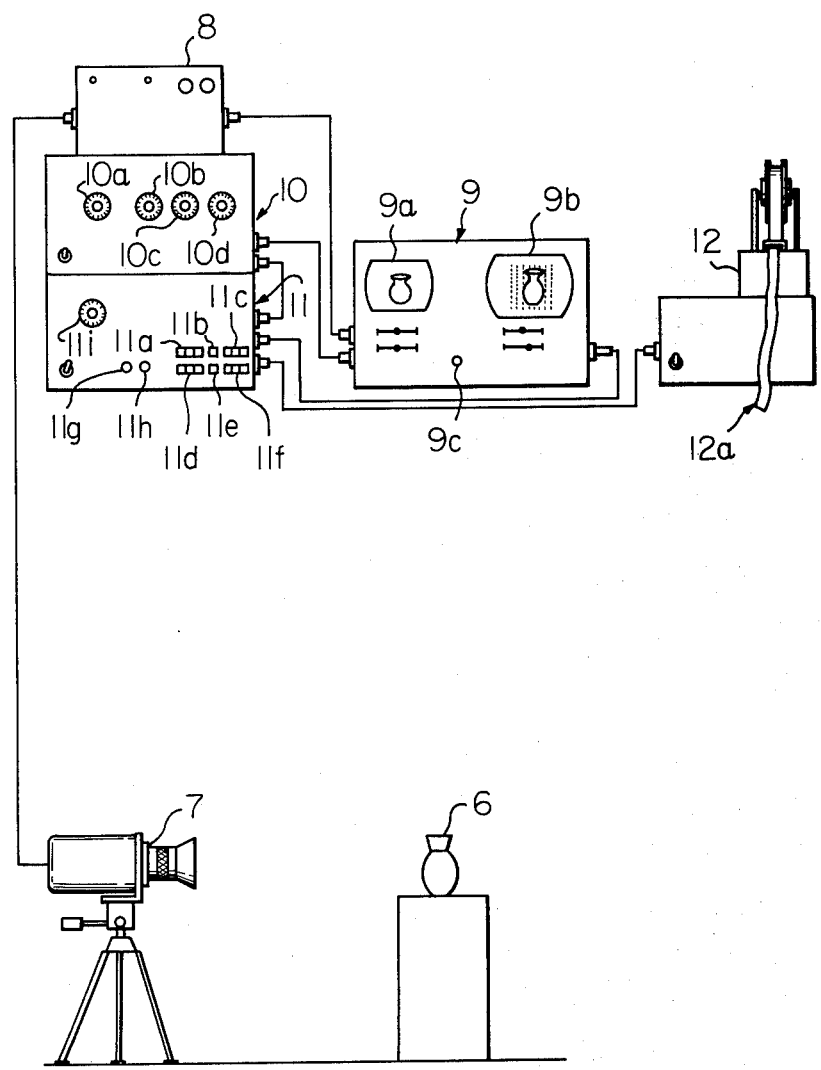
FIG. 2 is an embodiment of an arrangement of a fundamental construction, which is carried out according to the present invention in the knitting industrial field using a paper tape.
Figure 3:
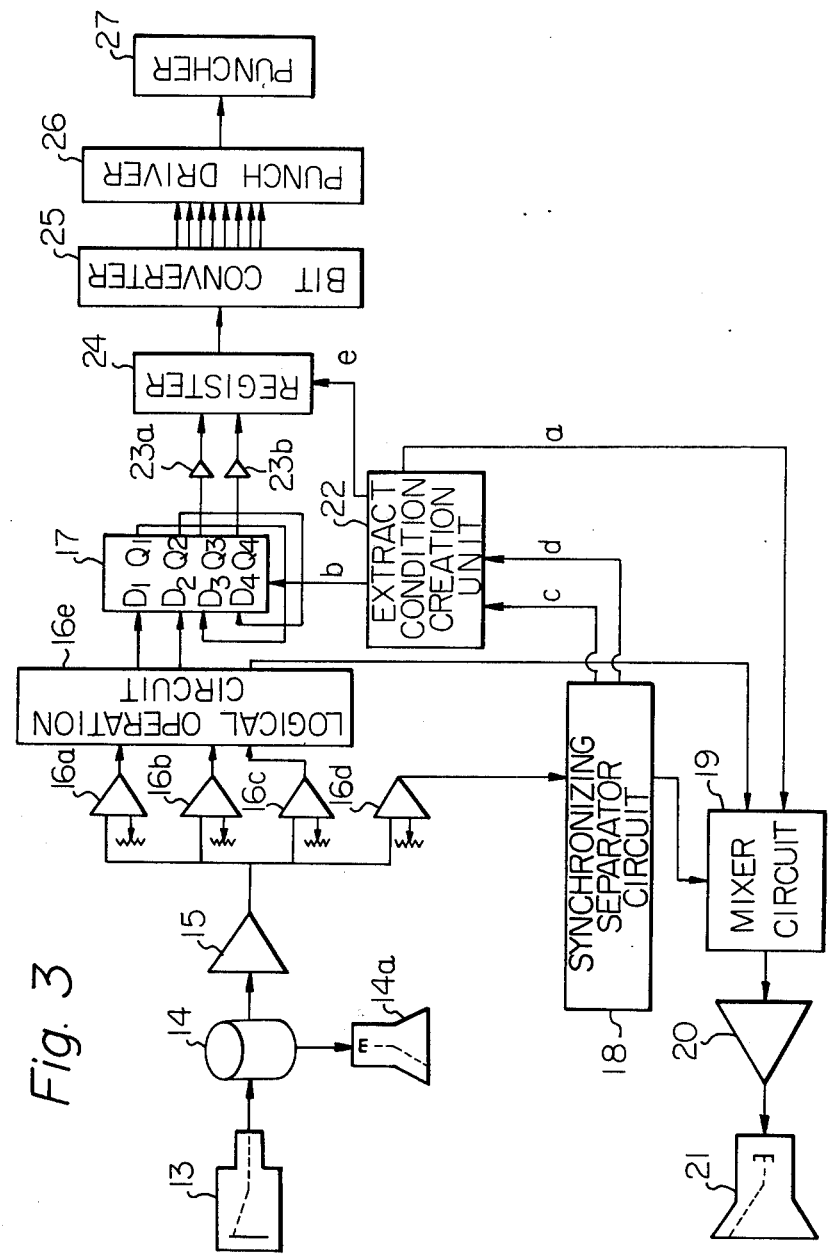
FIG. 3 is a block diagram which executes the embodiment shown in FIG. 2.

This embodiment corresponds to a case in the knitting industry, wherein the before-mentioned paper tape information is formed based on the information from the object; that is, with regard to the irregularity of the object, color of the object or a combination of these. FIGS. 2 and 3 show an arrangement and a circuit block diagram wherein the basic pattern information is formed by using a monochrome television camera.

Figure 6:
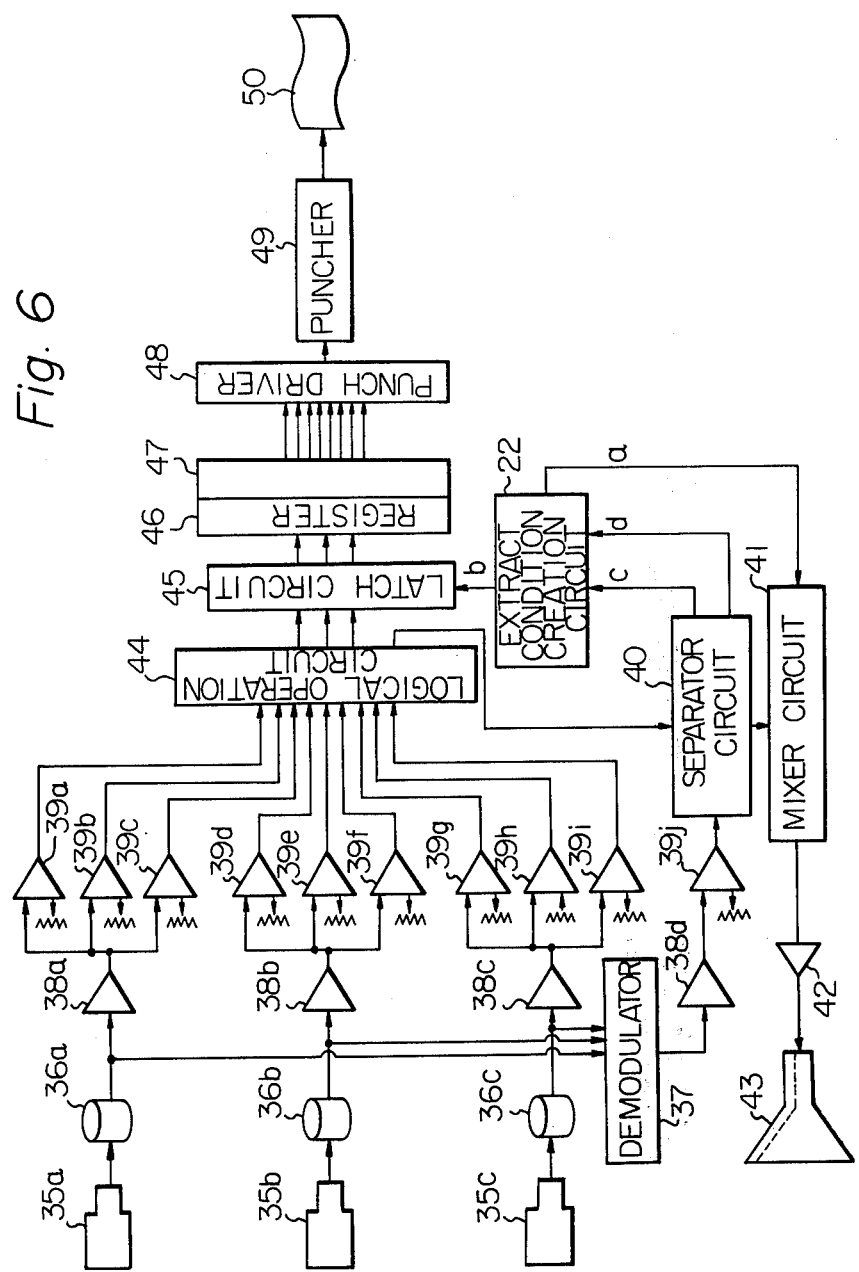
FIG. 6 is a block diagram which performs the embodiment shown in FIG. 5.

As shown in FIG. 2, the construction of the present invention is composed of a monochrome television camera 7 which converts the original FIG. 6 into a video signal, a camera control unit 8 which is used for controlling said television camera 7, a first cathode ray tube display 9a which stores and monitors the information from one field of the output of said camera control unit 8, a Memory Vision 9 (manufactured by Hitachi Densi Co., Ltd.) including a second cathode ray tube display 9b which combines the converted video signals of the television camera 7 and is used for designing the pattern, a push button switch 9c, a signal conversion unit 10 which converts the output video signal of a magnetic disc included in said Memory Vision 9 into a digital signal, an extract condition creation unit 11 which is used for extracting only the desired information from the information corresponding to the original figure and a paper punch unit 12 which supplies said extracted information to the knitting machine. FIG. 2, the output from the television camera unit 7 including a synchronizing signal is stored in the magnetic disc of a Memory Vision 9 via the camera control unit 8, connected to said magnetic disc by a shield cable, and the content of said Memory Vision 9 can be observed on the first cathode ray tube display 9a.

A video signal repeatedly reproduced from the magnetic disc of the Memory Vision 9 is supplied to the signal conversion unit 10 by way of a shielded cable. Said signal conversion unit is composed of three circuits. The first of said three units is voltage comparator circuits, one of which separates the synchronizing signal from the video signal, and the other of which separate the input video signal into different voltage levels, the second is a binary code conversion circuit which converts the outputs of the voltage comparator circuits to four kinds of binary coded signals, and the third is a mixer circuit which combines the outputs of each voltage comparator circuit and the signal indicating the range to be extracted from the extract condition creation circuit and which then displays the combined signal to the second cathode ray tube display. In the signal conversion unit 10, the input video signal is converted via three Schmit trigger circuits each having a different voltage level into rectangular wave signals each hving a bandwidth proportional to the above-mentioned voltage levels, and another Schmit trigger circuit separates the synchronizing signal which is included in the input video signal, from said input video signal. In the signal conversion unit 10, the purpose of the volume 10a which is provided on the front of the panel is to adjust the voltage level of the synchronizing signal, volumes 10b – 10d are provided for the purpose of determining the three separating voltage level of the input video signal.

Next, three separate signals are converted, via a logical cirucit, into four binary code signals, representing white (HH), light-gray (HL), dark gray (LH) and black (LL). Said four binary code signals are supplied, together with the separated horizontal and vertical synchronizing signals to the extract condition creation unit 11. Also, the rectangular wave signals from each voltage comparater cirucit are combined at the mixer circuit and are then converted into a mosaic type video signal, and are displayed on the second cathode ray tube display 9b in the Memory Vision 9.

Next, the extract condition creation unit 11 includes one variable clock pulse generator, digital switches 11a – 11f each of which determines the first positions and the last positions and the pitches in the horizontal and vertical directions, counters corresponding to said digital switches, and a latch circuit which temporarily stores the binary code signals from the signal conversion unit. In said extract condition creation circuit 11, said clock pulse from the variable clock pulse generator is counted by one of the counter circuit using the horizontal synchronizing signal as a Trigger signal. When the counted pulses coincide with a condition which is determined by the digital switch, a coincidental signal is generated which opens the horizontal gate. In the vertical direction, the horizontal synchronizing pulses are counted by the vertical synchronizing pulses as a trigger signal, and the vertical gate is open during one scanning line wherein the counted pulses are coincidental with the value which is determined by the digital switch. And, by the AND outputs of the horizontal and the vertical gates, another gate is opened during one clock pulse and an extract signal is generated every 1/60 second. This extract signal is supplied to the clock pulse input terminal of the latch circuit and is used as a clock pulse for receiving data in the latch circuit.

Next, this extract signal is supplied to a mixer circuit in the signal conversion unit 10 where the mosaic video signal is composed and is displayed on the cathode ray tube display 9b together with the extract signal. Digital switches 11a – 11f for determining the area to be extracted from the original figure and the volume 11i for varying the oscillation frequency are all positioned on the front panel of unit 11.

The signal which is sent from the latch circuit is supplied to a puncher unit 12 which includes two bit register, eight bit code converter circuits for converting the two bit binary information signals into a code signal and using them on paper tape, a puncher driver and a puncher. In the puncher unit, two bit coded signals are converted into eight bit coded signals, and together with the information concerning the starting, changing lines, returning to the starting point and the stopping operations of the puncher unit, the puncher is driven by the puncher driver and the paper tape 12a is continuously put out.

Therefore, when the operator completes the positioning of information concerning said original picture 6 is recorded on the first cathode ray tube display 9a by the operator of said push button switch 9c. When the above-mentioned recording is finished, the composite picture image and the extract signal appear on the second cathode ray tube display 9b. Therefore, the operator, observing said cathode ray tube display 9b adjusts the volume 10b – 10d, and determines the distribution of the gradation of light and dark. When the distribution of said gradation is completed, the operator operates the digiswitch so as to determine the range to be extracted from the area of the gradation.

Next, the start switch 11g is pushed, when the distribution of the gradation is readjusted if necessary, and then the stop switch 11h is pressed.

Figure 4:
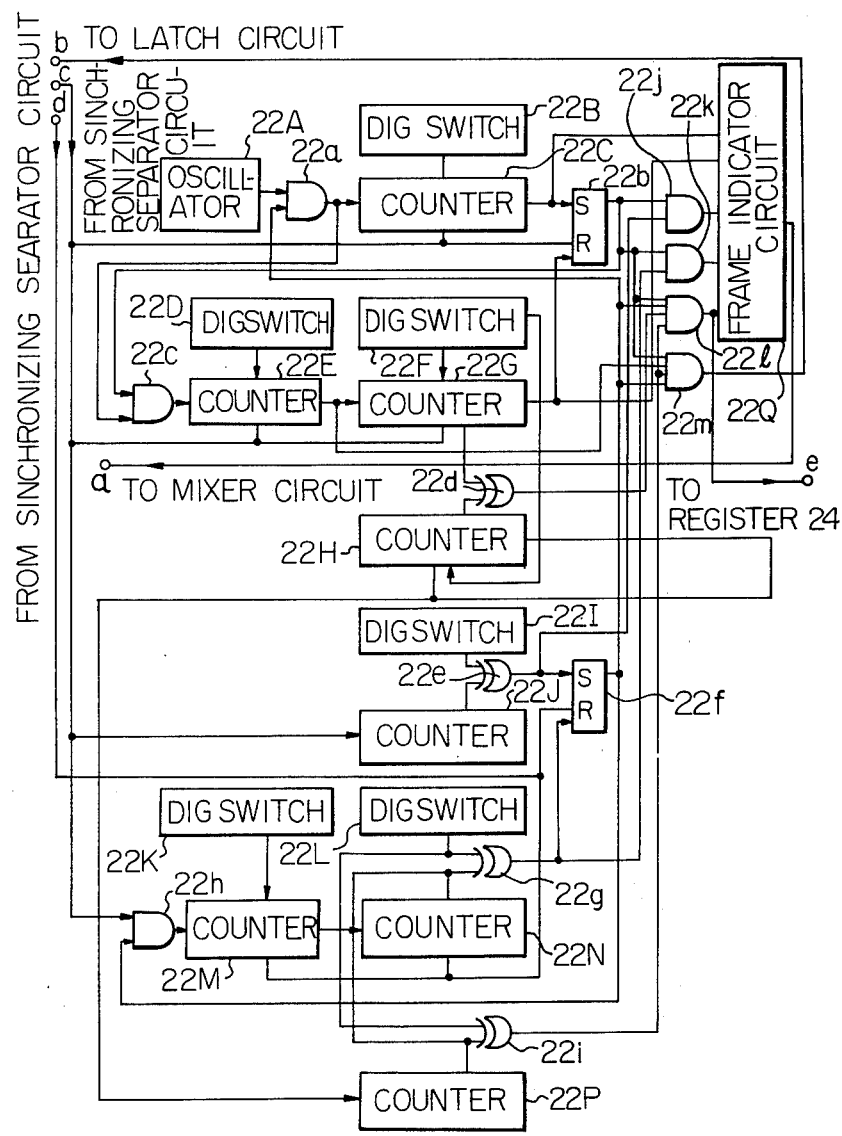
FIG. 4 is a part of the unit shown in FIG. 3.

FIGS. 3 and 4 show the circuit construction of the present embodiment. Referring to FIG. 3, the signal conversion unit is composed of a magnetic disc 14 which stores the analogue signal from the television camera 13, a monitor 14a for the magnetic disc 14, a buffer amplifier 15, three Schmit trigger circuits 16a – 16c which separate said shade gradation of the original figure, one Schmit trigger circuit 16d which separates the synchronizing signal from the output of said buffer amplifier 15, a logical operation circuit 16e which converts the outputs of said Schmit trigger circuits 16a – 16c into four kinds of binary coded signals, that is, white, light gray, dark gray and black, a latch circuit 17 which stores the output of said binary coded signals in accordance with the driving velocity of the puncher, a synchronizing separator circuit 18 which separates the synchronizing signal from the Schmit trigger circuit 16d into a horizontal synchronizing signal and a vertical synchronizing signal, a mixer circuit 19 which combines said synchronizing signal, three rectangular wace signals from the logical operation circuit 16e and a frame indication signal from the extract condition creation circuit 22, a buffer j amplifier 20, a cathode ray tube display 21, the extraction condition creation circuit 22, a register 24 which stores the output of the latch circuit 17 via buffer amplifiers 23a, 23b by using the sampling pulse from the extract condition creation circuit 22, eight bit converter 25 which converts the two bit information from the register 24 into eight bit information, a puncher driver 26 and a puncher 27. Referring to FIG. 3, line "a" indicates a passage through which a frame signal indicating the extract condition flows, line "b", a passage along which the clock signal flows to the latch circuit 17, lines "c" and "d", passages along which the horizontal and vertical synchronizing signals flow, respectively, and line "e" shows the route of a signal showing the positions which are selected from the AND gate 22l shown in FIG. 4.

FIG. 4 shows a block diagram of the extract condition creation circuit 22 shown in FIG. 3. When the first position to be selected in the vertical direction, that is the value of a three figure digital switch 22I which determines the first scanning line to be selected, is coincidental with the number of the counter 22J, which counts the number of horizontal synchronizing signals supplied from line "c", a gate 22e is actuated and sets a flip-flop 22f and said set signal of the flip-flop circuit 22f is supplied to one input terminal of a gate 22a. The other input terminal of said gate 22a receives the clock pulse signal from an oscillator 22A. The output of the gate 22a is supplied to a counter 22C.

Digital switch 22B is a three figure digital switch which determines the first position of the information to be extracted in the horizontal direction. When the value of the counter 22C is coincidental with the value of the digital switch 22B, a flip-flop 22b is actuated, and its output is supplied to one input terminal of a gate 22C. The other input terminal of said gate 22C receives the output of said gate 22a. The output of gate 22C is supplied to a counter 22E. Digital switch 22D is a one figure digital switch and is provided for determing the pitch of extraction of information in the horizontal direction. When the value of the digital switch is coincidental with the value of the counter 22E, the output of said counter 22E is supplied to a counter 22G. Digital switch 22F is provided for determining the final point of the information to be extracted in the horizontal direction. When the value of the counter 22G and the value of the digital switch 22F are coincidental, the output of the counter 22G resets the flip-flop 22b. In addition, the set output of said flip-flop 22f is also supplied to a gate 22h, and the output of said gate 22h is supplied to a counter 22M. Digital switch 22K is a one figure digital switch and is provided for extracting the information in the vertical direction, that is, for selecting the scanning line. When the set value of the digital switch 22K is coincidental with the counted value of the counter 22M, the output of the counter 22M is supplied to a counter 22N.

Next, a digital switch 22L whigh is a three figure digital switch, is provided for determining the final position of the information to be extracted in the vertical direction. When the set value of the digital switch 22L is coincidental with the counted value of the counter 22N, the output of the gate 22g resets the flip-flop 22f. That is, the flip-flop 22f which is in the which has been set during the extraction of the information, is completed in accordance with its set condition. A horizontal synchronizing signal resets the flip-flop 22b and the counter 22E, and loads the counter 22C and 22G. A vertical synchronizing signal supplied via the line "d" resets the flip-flop 22f and loads the counters 22M and 22N.

A gate 22m is provided for loading said latch circuit 17, and said gate 22m receives a signal from the flip-flop 22f which determines the range of information to be extracted, a signal from flip-flop 22b which determines the range of information to be extracted, a signal indicating the horizontal pitch from the counter 22E and a signal indicating the output of the gate 22i when the value of counters 22N and 22P are coincidental. When one element of information is extracted, the coincidental timing of the counters 22G and 22H shifts, in order, in accordance with the pitch signal coming from the digital switch 22D via the counter 22E. When the final horizontal point to be extracted is reached, the counter 22H is reset and the output of said counter 22H is supplied to the counter 22P. When this happens, the coincidental timing of the value of the counters 22P and 22N is shifted, in accordance with the vertical extracting pitch from the counter 22M, to a position corresponding to the next extracting scanning line. This operation is repeated until the position corresponding to the last extract scanning line which is determined by the digital switch 22I, is reached. A gate 22i is opened once per one field.

Therefore, the gate 22m is opened in synchronization with the gate 22i, and information is written on the latch circuit 17 in synchronization with the opening of gate 22m via the line "b".

The frame indicator circuit 22Q composes the signals which indicate each extract condition, that is, the first horizontal extract position from the counter 22C, the final horizontal extract position from the counter 22G, the first scanning line position from the AND gate 22j which is determined by the timing of the flip-flop 22b and the gate 22e, the final scanning line position from the AND gate 22k which is determined by the timing of the flip-flop 22b and the gate 22g, and the positions to be extracted from the AND gate 22l which is determined by the timing of the flip-flop 22b and 22f, and by the gates 22d and 22i. And the combined output of the frame indicator circuit 22Q is supplied via the line "a" to the mixer circuit 19 shown in FIG. 3 for displaying on the monitor 21.

Embodiment 2

This embodiment is similar to embodiment 1, corresponding to a case the knitting industry, wherein the paper tape information is formed based on information regarding irregularity, color or a combination of these by using a color television camera. The basic pattern information is formed by using said color television camera according to the arrangement shown in FIG. 5.

Figure 5:
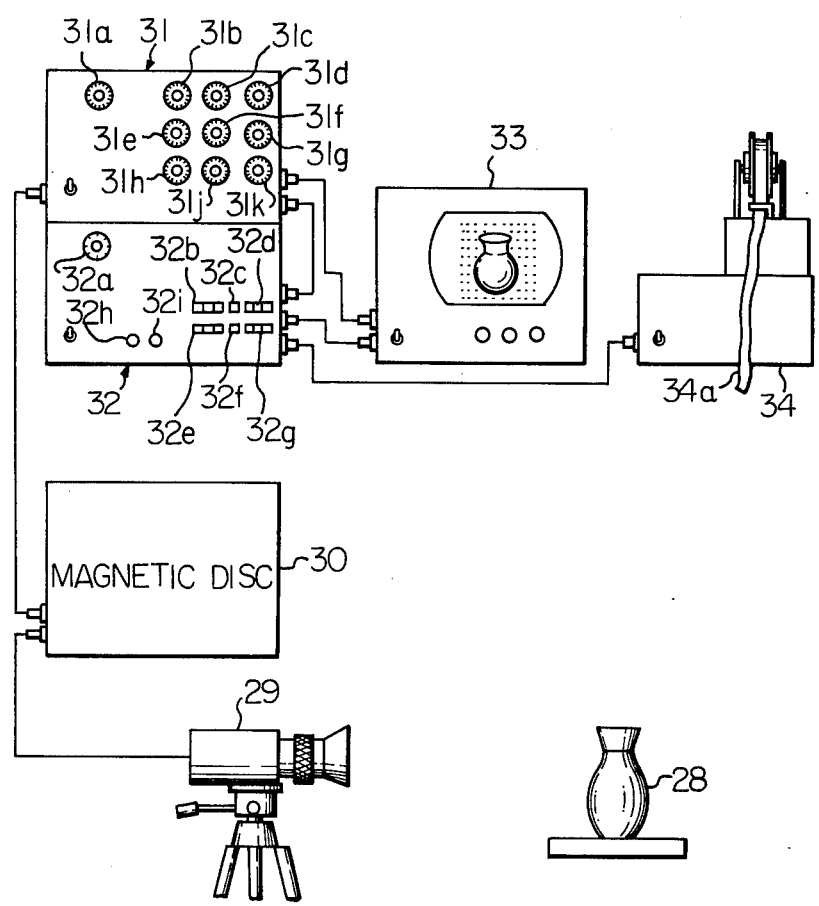
FIG. 5 is an embodiment which carries out the invention of the present invention through the use of a color television camera, using a paper tape.

Said arrangement in FIG. 5 consists of a color television camera 29, which converts the original FIG. 28 into electrical signals indicating the colors, that is, red, green and blue, a magnetic disc 30 which temporarily stores each output of said color television camera 29, a code conversion unit 31 which discriminates the color of each signal representing the color, an extract condition creation circuit 32 which is provided for extracting only the desired color information from the original figure, a color cathode ray tube display unit 33 which composes and displays the coded signals of said code conversion unit 31 with the signal indicating the range of the original figure to be extracted, determined by the extract condition creation circuit 32 and a tape puncher unit 34 for putting out the output of the information which is extracted.

The output of said color television camera 29 is temporarily stored in the magnetic disc. The analogue signals representing the respective colors, that is, red, green and blue, together with the combined analogue video signal are supplied to the signal code conversion unit 31.

Said signal conversion unit 31 includes nine voltage comparator circuits which have different voltage levels, respectively, for separating each color signal into voltage levels, one voltage comparator circuit which separates the synchronizing signal for the composed video (color video) signal, a logical circuit which discriminates and converts the outputs of each voltage comparator circuit into binary coded signal outputs and a converter circuit which converts the outputs of each voltage comparator circuit and also converts the frame indicating signal from the extract condition creation circuit into a signal form which can be displayed on the cathode ray tube display. At first, the input video signal is converted into rectangular wave signals by nine Schmit trigger circuits; (three Schmit trigger circuits are provided for each color, that is, red, green and blue). The level of each Schmit trigger circuit is adjusted by the volumes 31b – 31k provided on the front panel of the signal conversion unit 31. The volume 31a is provided for adjusting the separation level of the synchronizing signal from the magnetic disc 30. The output signals separated by the voltage comparator circuits are converted into binary coded signals corresponding to each color of the original by the logical circuit for discriminating the color, and supplying said discrimination to the extract condition creation until 32. And also, the outputs of the voltage converter circuits, with the synchronizing signal, are demodulated into the video signal and are displayed on the cathode ray tube display 33.

By the operation of the digital switches 32b – 32g, the extract condition creation unit 32 generates, in a similar manner as shown in the embodiment 1, the extract signals in accordance with a predetermined value of the digital switch and supplies binary coded signals to the latch circuit, in order. These extracted signals are sent to the signal conversion unit 31 and are combined with said demodulated video signal therein and the extracted positions are displayed on said cathode ray tube display 33. The overflow signals from the latch circuit are sent, in order, to the puncher unit 34, which includes a three bit register, an eight bit code converter circuit for converting the binary coded signal into paper tape code information, a puncher driver and a puncher. In said puncher unit 34, the three bit code is converted into an eight bit code and the starting, stopping and returning to the original position information are added to the eight bit code and the output for said paper tape 34a is put out in order. The object of using a three bit code is that the colors are limited to six, so, if necessary, the number of bit codes can be modified. Therefore, the operator, as described in embodiment 1, adjusts the gradation of the colors by adjusting the volumes 31b, – 31k on the front panel of the signal conversion unit 31 while observing the figure displayed on the cathode ray tube display 33 and then extracts the range to be extracted by adjusting the digital switches 32b – 32g on the front of the extract condition creation unit 32. After completing the above-mentioned operation, the operator pushes the push button switch 32h and the paper tape 34a is put out. When the operator must stop this operation, it can be reset by pressing the stop push switch 32i.

FIG. 6 shows a circuit diagram of the apparatus shown in FIG. 5. As shown in FIG. 6, the circuit is composed of three color television cameras 35a – 35c, three magnetic discs 36a – 36c which correspond to each television camera, a demodulator 37 which combines the output of said magnetic discs so as to demodulate said output into the video signal, buffer amplifiers 38a – 38d, Schmit trigger circuits 39a – 39i which decompose the outputs representing the colors into voltage levels, one Schmit trigger circuit for separating the synchronizing signal from the output of the buffer amplifiers 38a – 38d, a separator circuit 40 which separates the horizontal and vertical signals from the above-mentioned separated synchronizing signal, a mixer circuit 41 which combines the signal representing the extract positions determined by the extract condition creation circuit 22, by the synchronizing signal and by the outputs of the Schmit trigger circuit a buffer amplifier 42, a cathode ray tube color display 43, a logical operation circuit 44 which discriminates the color of the outputs of the Schmit trigger circuits 39a – 39i and puts out said colors by means of a three bit signal output, a latch circuit 45, an extract condition creation circuit 22, three bit register 46 which stores the signal from the latch circuit 45, an eight bit code converter 47 which converts the output of the latch circuit 45 into an eight bit code information signal, a puncher driver 48 and a puncher 49 which supplies the paper tape 50. The extract condition creation circuit 22 is the same as the one shown in FIG. 4.

Embodiment 3

Figure 7:
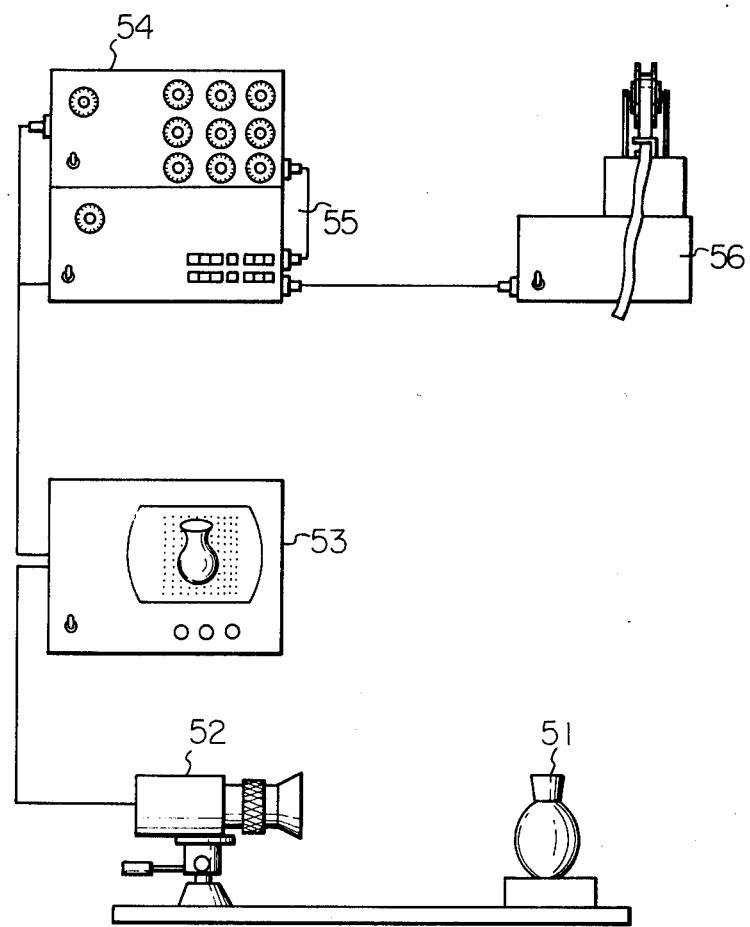
FIG. 7 is another embodiment which is carried out by the present invention with reference to the knitting industry also using a paper tape.

This embodiment also corresponds to a case in the knitting industry. The paper tape information is formed based on information with regard to irregularity, color or a combination of these. The differences between this embodiment and before mentioned embodiments are that this embodiment uses a fixed camera and has no memory means as is shown in FIG. 7. Because of this, the construction of this embodiment relates to only a static case wherein the object of the original figure is static such as a photograph or a pattern on paper. As shown in FIG. 7, the construction of the present embodiment is composed of an original static object 51, a fixed color television camera 52, a cathode ray tube color display 53 for observing the analogue video signal from said color television camera 52 and from the extract condition creation unit 55, a signal conversion unit 54 which discriminates the color and an extract condition creation unit 55. In this embodiment, a memory, such as a magnetic disc, is not necessary because the television camera and the original object are fixed onto the same base. In this embodiment, as the analogue video signal is monitored, the output information is shifted with respect to the information displayed on the cathode ray tube display, after the colors are discriminated. Therefore, after the calibration is carried out, the volume of adjustment on the front of the signal conversion unit must be maintained in a fixed condition. The operator operates the digital switch arranged on the front of the extract condition creation unit 55, superimposes the video signal indicating the range to be extracted onto the analogue video signal and adjusts the pattern to be extracted. The construction of the present embodiment can be easily realized by omitting the magnetic disc shown in FIG. 5 and changing the cable connection in accordance with said omission of said magnetic disc. The system of this embodiment for processing the signals representing colors red, green and blue is the same as the system in embodiment 2. Therefore, no detailed explanation is necessary. The construction shown in FIG. 7 is applicable to a case using a monochrome television camera.

The above-mentioned embodiments 1 through 3 show cases wherein the basic pattern information is formed based on paper tape.

Figure 8:
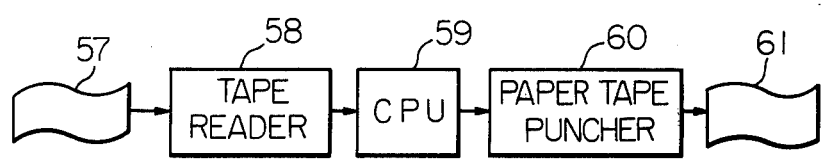
FIGS. 8 and 9 show processes which control the knitting machine by using the paper tape.
Figure 9:
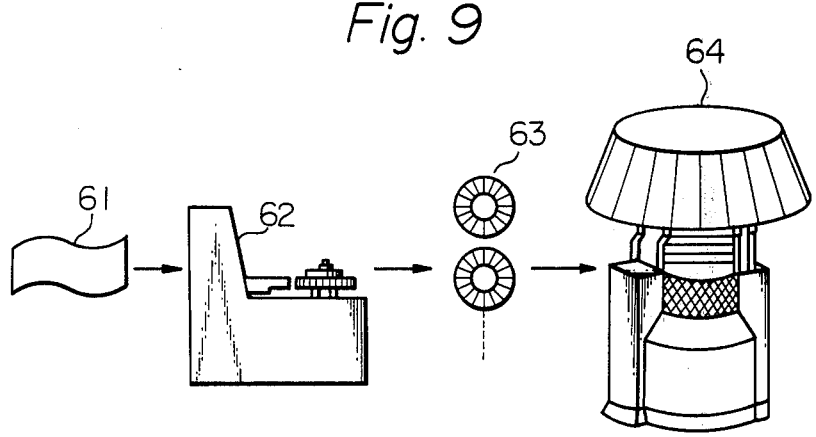

The following example shows a knitting machine which is controlled by paper tape formed in the above-mentioned manner. FIGS. 8 and 9 are blockdiagram for controlling a knitting machine type M-48 which is a semi-jacquard machine, using a pattern wheel and is manufactured by Morat Co. Ltd, in West Germany. The paper tape 57 which is obtained by the present embodiment, is supplied via a tape reader 58 to a computer 59 where the tape is processed based on the fundamental pattern information from the original figure, and said information on the tape is converted into a tape code for a M-48 type knitting machine. The tape 61 is then sent from the paper tape puncher 60 to an auto setter 62 which is manufactured by Fukuhara Industrial and Trading Co. Inc. Said tape controls the pattern wheel 63 provided for controlling a needle selector of the knitting machine, said pattern wheel controls the knitting machine 64 and knitted fabric can be obtained in accordance with the origianl figure information

Embodiment 4

Next, we will explain the embodiment of on-line which controls a numerical control knitting machine used in the knitting industry.

Figure 10:
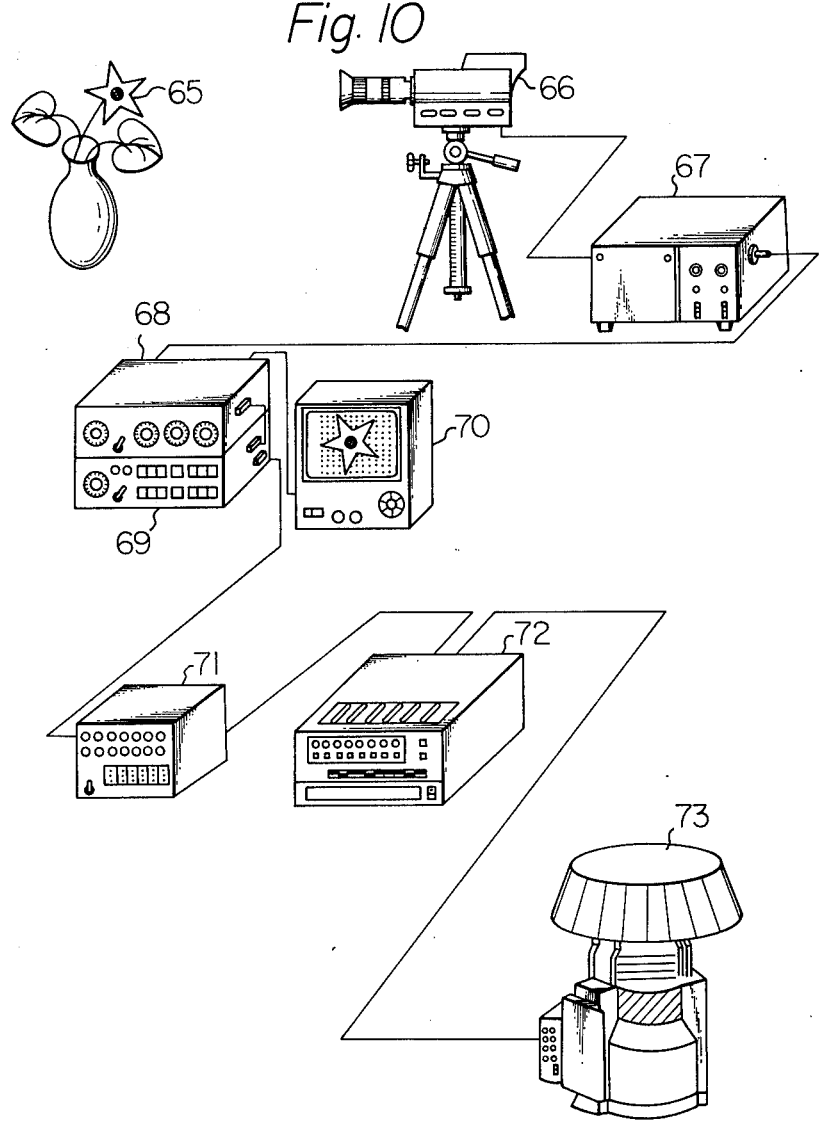
FIG. 10 is another embodiment in the knitting industry wherein an NC knitting machine is controlled in an on-line system of a computer.

The arrangement shown in FIG. 10 is composed of a monochrome television camera 66 which takes a picture of an original FIG. 65, a camera control unit 67, a signal conversion unit 68, an extract condition creation unit 69, a cathode ray tube display unit 70, an interface unit 71, a computer unit 72 and a numerical controlled knitting machine 73.

When the pattern design as described in the embodiments 1 through 3 is completed, the converted signal is read in order by a direct memory access channel (D.M.A.), and the information which is extracted from the total information is stored in the memory means. After the above-mentioned operation is finished, the computer carries out various kinds of processes and code conversions. The computer's output controls said numerical control knitting machine.

Figure 11:
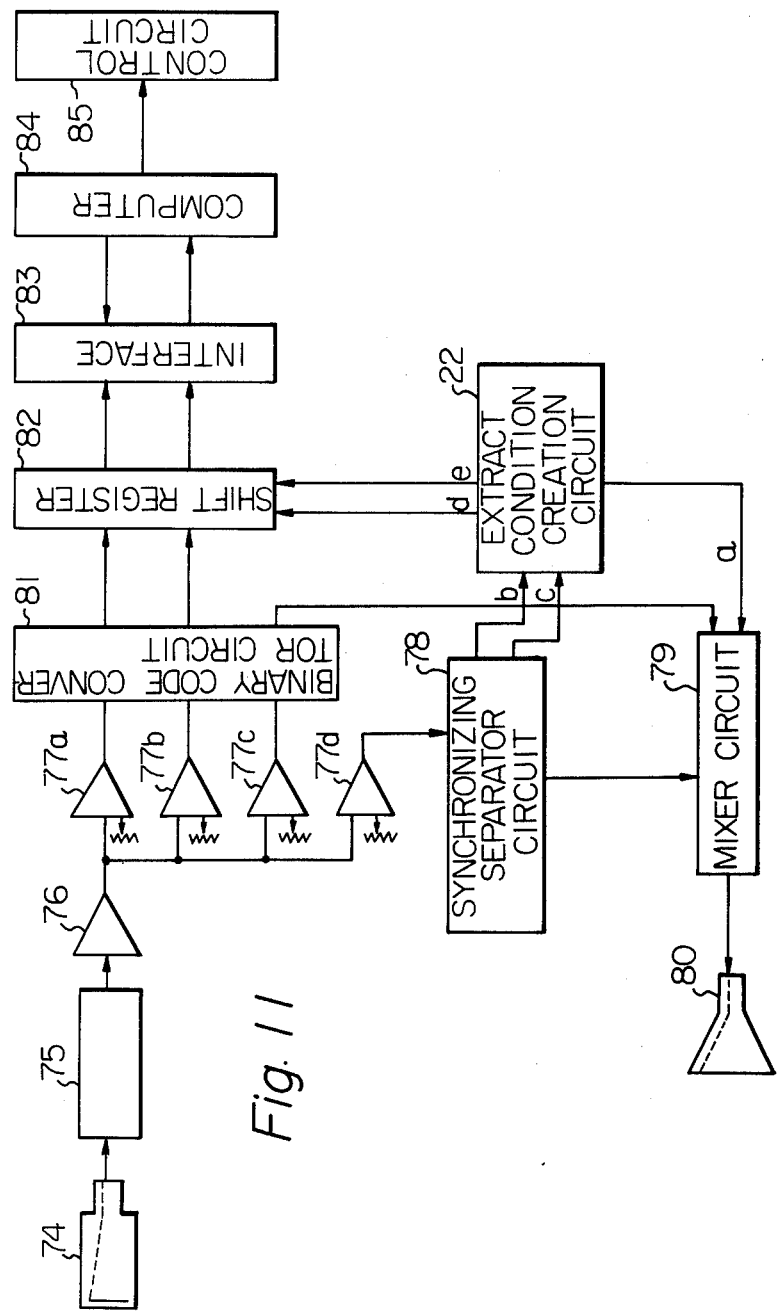
FIG. 11 is a block diagram which executes the embodiment shown in FIG. 10.

FIG. 11 shows a block diagram carrying out the arrangement of the present embodiment. Said block diagram consists of a monochrome television camera 74, a camera control unit 75, a buffer amplifier 76, Schmit trigger circuits 77a – 77d, a synchronizing separator circuit 78, a mixer circuit 79, a cathode ray tube display 80, a binary code converter circuit 81, a shift register 82, an interface 83, a computer 84, and a control unit circuit 85 for a numerical control knitting machine. The extract condition creation circuit 22 controls the supply of output of the binary code converter circuit 81 to the shift register 82.

In the above-mentioned embodiment, the pattern is formed based on the paper tape, but the paper tape puncher is slow. Therefore, the latch circuit is used for adjusting the speed of the paper tape. When said DMA channel is used, registors which store information concerning one scanning line are required, in accordance with the number of output bits and the information corresponding to 1/60 second or 1/30 second of the field are temporarily stored in said registor, after which, said stored information is read by the computer.

This embodiment is very advantageous except for the fact that the capacity of the memory increases.

Embodiment 5

Figure 12:
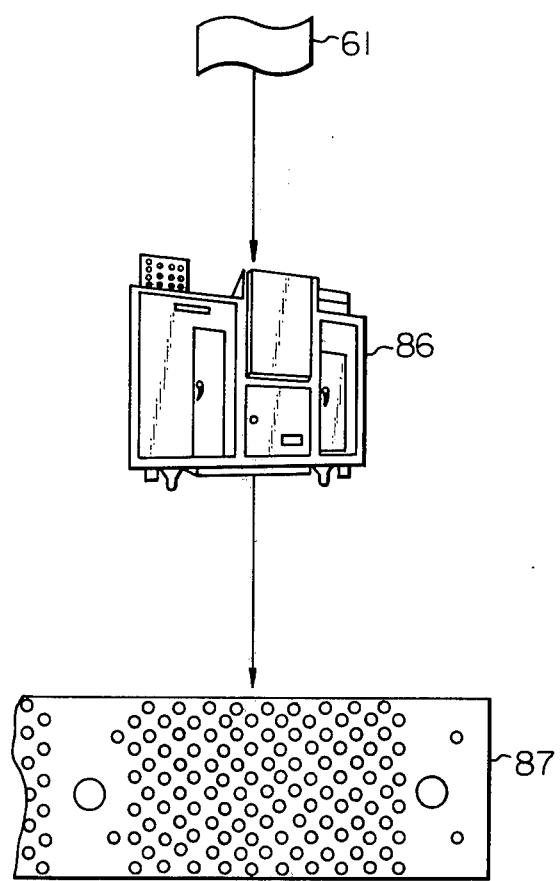
FIG. 12 is an embodiment wherein the present invention is applied to the textile industry.

In this embodiment, we will explain the case using paper tape in relation to the textile industry. Paper tape which is obtained in the above-mentioned embodiments 1 through 3 is supplied to the computer as shown in FIG. 8. Via a code conversion process and a pattern treating process said paper tape is supplied to an auto card punching machine 86 as shown in FIG. 12 wherefrom a pattern card 87 can be produced.

In the textile industry, various combinations of the units are also applicable. Analogue or digital (staircase wave) video signals can be displayed on the cathode ray tube display unit. The kind of original figure color construction and arrangement used, can be selected by a suitable combination of said units. And, in the present invention, field bright signal indicating the rage of information to be extracted is indicated as dots, for the following reason. Each one of the above-mentioned dots indicates a point to be extracted corresponding to one knitted stitch. Therefore, the disarrangement of one extracted unit will cause confusion in the structure of the pattern, which would be extremely disadvantageous. In the printing industry, however, address information is not necessary since it is sufficient that the field signal can be indicated by only the outline of the range to be extracted. When, the video signal employs a staircase wave signal, a geometrical pattern figure is produced on the design paper having very clear boundary lines, thus enabling the pattern design to be carried out very easily.

It should be understood that the above-mentioned embodiment 5 can be applicable to any other case where the pattern is formed on an article.

Next, we will apply the method of the present invention to a textile printing process which requires some modifications since it is somewhat different from screen printing or roller printing.

Embodiment 6

Figure 13:
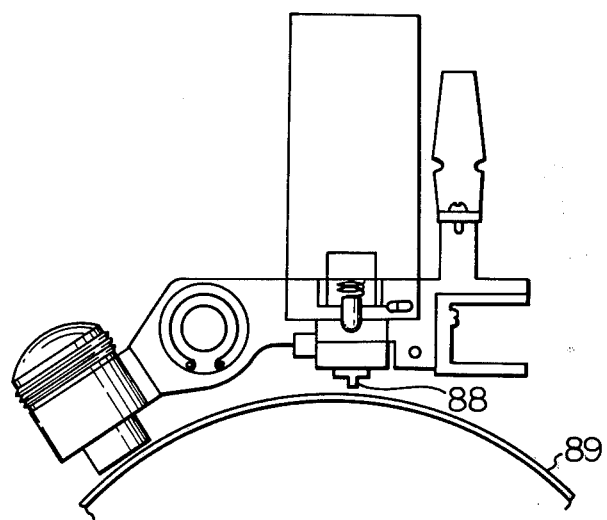
Figure 14:
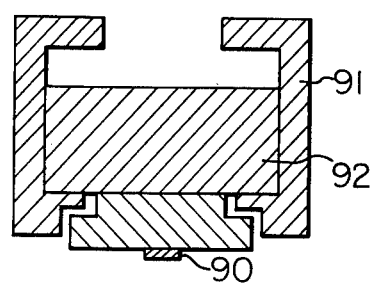

Paper tape obtained by the process as mentioned in Embodiment 1 was code-converted using the process illustrated in FIG. 8 and then the figure is supplied to the XY plotter shown in FIG. 13. The felt tip 90 impregnated with dyestuff solution as shown in FIG. 14 was used as a pen 88 of the XY plotter and thereby cloth 89 was provided with a pattern composed of color dots like a painting of the impressionist school. This cloth 89 was then subjected to steaming color development, rinsing and soaping. As a result, a print having a pattern nearly the same as the original figure was obtained. This embodiment was conducted with the following conditions present.

| | | | |
|---|---|---|---|
| (a) | XY plotter: Digital Plotter DPL-602 (manufactured by Iwatsu Electric Co., Ltd.) | | |
| (b) | Sample: polyester taffeta textile | | |
| (c) | Composition of dye liquid with which the pen was impregnated: | | |
| | Dianix Fast Navy Blue 2R-FSM/D (dispersed dyes prepared by Mitsubishi Chemical Industries Ltd.) | | 3 |
| | Sodium chlorate | | 1 |
| | Yuzen size + water | | 96 |
| | | Total: | 100 |
| (d) | Steaming: | 130° C × 30 min | |
| (e) | Soaping: | sodium hydroxide (38° Be) | 3cc/l |
| | | hydrosulfite | 1g/l |
| | | 70° C × 20 min | |

Embodiment 7

The punching head 93 shown in FIG. 15 was used in place of the XY plotter of Embodiment 6 and the cloth 89 was replaced by paper stencil 94 which was punched according to a pattern nearly the same as the original.

A manual printing process using said paper stencil 94 provided a print with a pattern similar to that obtained in Embodiment 6. Embodiment 7 was conducted with the following conditions present.

| | | | |
|---|---|---|---|
| (a) | Sample: polyacrylonitrile tropical textile | | |
| (b) | Diameter of punching head: 1.5 mm | | |
| (c) | Composition of printing paste: | | |
| | Aizen Cathilon Pure Blue 5GH(cation dyestuff prepared by Hodogaya Chemical Co., Ltd.) | | 1 |
| | Glysolve AOX(dyestuff solvent prepared by Meisei Chemical Works Co., Ltd.) | | 3 |
| | acetic acid(48%) | | 3 |
| | tartaric acid(50%) | | 3 |
| | base size | | 70 |
| | water | | 20 |
| | | Total: | 100 |
| (d) | Base sizing agent: Nafka Kristal Gum 40% 1:1 Yuzen size | | |
| (e) | Steaming: | 100° C × 30 min | |
| (f) | Soaping: | Monogen | 1g/l |
| | | 60° C × 20 min | |

Embodiment 8

Output from the disc 14 shown in FIG. 3 in connection with Embodiment 1 was A/D converted through the interface adapted to receive said output after passing through the RJ flip-flops 22b, 22as shown in FIG. 4, sent to the computer and then was figure by the XY plotter as shown in FIG. 13. As the pen for the XY plotter, a dyeing liquid spraying nozzle 98 provided with an electromagnetic flow regulating valve 97 adapted to be driven by a pulse motor through a D/A convertor 95 and an amplifier 96 as illustrated by FIG. 16 was used. The nozzle 98 was controlled so as to scan the cloth 89 in a manner identical to the television scanning beam.

The pattern to be printed was designed with this wiring arrangement modified so that the original designated as 6 in FIG. 2 which has been picked up by the television camera 7 is supplied in the form of analogue signals to the CRT display and, therefore, only the frame of said original is displayed. Figure output from the XY plotter gave the cloth a pattern similar to said original figure.

This cloth was then subjected to steaming, rinsing and soaping, and a beautiful print was obtained. This embodiment was conducted with the following conditions present:

| | | | |
|---|---|---|---|
| (a) | Drive mechanism: | cloth feed pitch — 0.2 mm nozzle feed pitch — 0.2 mm | |
| (b) | Sample: triacetate satin textile | | |
| (c) | Diameter of nozzle: | 100 μ | |
| | (Material) | (outer wall of stainless pipe having Teflon coating) | |
| (d) | Composition of dyeing liquid: | | |
| | Dianix Fast Sky Blue BM/D (dispersed dyes prepared by Mitsubishi Chemical Industries Ltd.) | | 3 parts |
| | sodium alginate | | 5 parts |
| | water | | 92 parts |
| | | Total: | 100 parts |
| (e) | Steaming: 100° C × 60 min | | |
| (f) | Soaping: | sodium hydroxide (38° Be) | 3cc/l |
| | | hydrosulfite | 1g/l |
| | | 70° C × 20 min | |

It should be understood from the above-described three embodiments that the present invention can be useful in the field of printing. The present invention has further embodiments which will be described later, in which the following components or steps can be used.

i. Pen of XY plotter
   a. the type adapted for drawing on paper,
   b. the type used in the so-called ink jet method utilizing static electricity.

ii. Control of dyeing liquid
   a. the direction of sprayed liquid is changed under the effect of an air stream or electric field.

iii. Types of objects to be printed on
   a. cloth, film, paper, metallic plate and so on
   b. sheet-like material on which the dyeing liquid is deposited and from which said dyeing liquid is transferred onto another material.

Embodiment 9

The signals obtained in Embodiment 1 were converted into ASCII (American Standard Code for Information Interchange) code or ISO (International Organization for Standardization) code and a typewriter was then activated so that these codes were printed out in characters according to shading and tonality so that the resulting pattern design could be observed.

In this embodiment, each point read by the typewriter was typed out on a scale identical to that of the design paper so that each point on the typed out sheet exactly coincided with the corresponding point to be read. Error checking was carried out by looking through these two paper sheets laid one on top of the other with light applied therethrough from the rear side, and the checker was able to easily discover errors by successively checking the points, on his first attempt. As for a pattern of dimension (100 × 100), this error checking was completed in only a few minutes. On the contray, the conventional method of error checking is usually performed with respect to two sheets laterally placed. A color or code of a point on, for example, the right hand sheet is identified and kept in mind and then this is repeated with respect to the corresponding point on the left hand sheet. When a pattern is relatively complicated, associating the read out point on the left hand sheet with the corresponding point on the right hand sheet is often accompanied by errors. Furthermore, this prior art method usually requires a lot of time, a lot of labor and a good memory on the part of the operator.

In this embodiment, at least one of the design sheet and the typing sheet must be pervious to light since the present inventions operation of error checking is accomplished by both sheets being laid on top of each other. The typewriter used in this embodiment must be one in which the feed pitches of the head and the platen are variable in contrast with an ordinary typewriter.

To meet this requirement, an ordinary typewriter was provided with a special mechanism. It is also possible to print with the use of an XY plotter. Color dots, especially those having the same colors as the corresponding colors expressed on the design sheet, were used as the codes. It was found that the desired effect achieved by this embodiment is more remarkable than that of the conventional method.

It will be obvious from the present embodiment that the range for which the present invention is effectively applicable, is wide. This aspect will be described with respect to some typical embodiments relating to application of the present invention in fields other than weaving, knitting and printing.

Embodiment 10

Signals from the register 24 as shown in FIG. 3 in connection with Embodiment 1 were applied to means shown in FIG. 17 for the manufacturing of high-and-low carpet which corresponds to tufted carpet having pile of various lengths.

Referring to FIG. 17, pile yarn 103 is fed by the feed rollers 104, 104' to the needle 102. In this operation, the electromagnetic clutch 106 was controlled through the amplifier 105 by signals obtained from the register 24 as shown in FIG. 3 in connection with Embodiment 1 so that, upon changeover of said clutch, the rotary velocity of the feed roller 104 and, therefore, the amount of pile yarn to be fed could be varied. Thus, the high-and-low carpet having a pattern nearly the same as to the original was obtained. This embodiment was conducted under the following conditions:
  a. Apparatus: PICKERING AUTO TUFTER manufactured by EDGAR PICKERING Co., Ltd.
  b. Pile yarn: Nylon 70%, wool 30%. 2/4 yarn.
  c. Pile height:
  high pile — 12 mm
  medium pile — 7 mm
  low pile — 4 mm
  d. Gauge: 5/32 inches.
  e. Stitch: 6/inch.

Embodiment 11

Space dyeing yarn was obtained using the arrangement of Embodiment 1 and a pattern was designed by limiting the volumes 10b to 10d to two shades and applying the signals from the register 24 as shown in FIG. 3 to the means as shown in FIG. 18.

Referring to FIG. 18, yarn 108, maintained at a constant tension under the effect of the tension guide 109, travels at a constant velocity through the guide 110 and then between the dyeing liquid supplying roller 11 and the arm 113 mounted on the driving portion of the rotatable solenoid 112. During this operation, said arm 113 of the rotatable solenoid 112 is responsive to the signals from the register 24 as shown in FIG. 3 in connection with Embodiment 1, and repeat rotary movement clockwise and counterclockwise at an angle of 10° many times, so as to press the travelling yarn 108 against the dyeing liquid supplying roller 111. Every time said yarn 108 is pressed by said arm 113 against said dyeing liquid supplying roller 111 which is, in turn, supplied with said dyeing liquid 115 from the dyeing liquid reservoir 114 and said supplying roller 111 is rotated at a constant velocity in the direction of yarn feeding, said dyeing liquid 115 is applied onto said yarn 108.

Said yarn 108 then travels alongue the guide 110a onto the heat roller 116 on which said yarn 108 is preheated to the extent that no dyestuff transfers elsewhere, and is then wound around the winder 117. Thereafter, the yarn 108 was subjected to steaming color development, soaping and softening. Then, the yarn 108 was knitted by a circular knitting machine and the desired space dyeing knit having a pattern nearly the same as the associated original, was obtained. This embodiment was conducted under the following conditions.
  a. Sample: acryl fibre 100%, 2/48 high bulk yarn

| b. | Composition of dyeing liquid: | |
|---|---|---|
| | Aizen Cathilon Blue 5GH(cathion dyes prepared by Hodogaya Chemical Co., Ltd.) | 2 |
| | Glysolve AOX(dyestuff solvent prepared by Meisei Chemical Co., Ltd.) | 2 |
| | acetic acid(48%) | 3 |
| | tartaric acid(50%) | 3 |
| | water | 90 |
| | Total: | 100 | c. Rotatable solenoid: Short-stroke DC Solenoid Model 60D (manufactured by Ushio Electric Inc.)
  d. Yarn velocity: 100 m/min
  e. Temperature of heat roller: 160° C
  f. Steaming: 100° C × 30 min
  g. Soaping: Monogen 1g/l 60° C × 30 min
  h. Softening: TA-430 1% owf 40° C × 15 min

Embodiment 12

Figure 19:
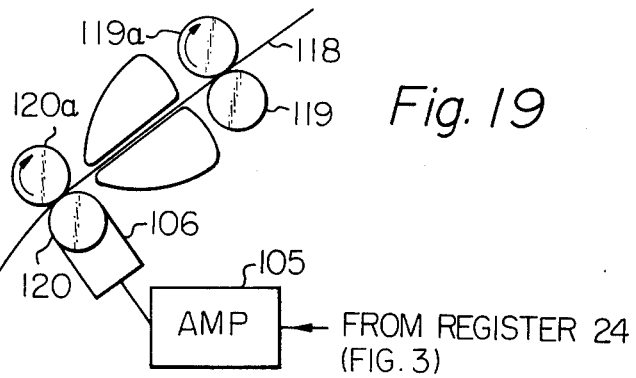
FIG. 19 is an embodiment wherein the present invention is applied to the manufacture of slub yarn.

Signals from the register 24 as shown in FIG. 3 in connection with Embodiment 1 were applied to the means shown in FIG. 19 in a process for manufacturing slub yarn by a spinning machine.

Referring to FIG. 19, the silver 118 is alternately drafted between the back rollers 119, 119a and the front rollers 120, 120a at different ratios, respectively. Drafting at a high ratio spins out the base yarn, while drafting at a low ratio forms the slub, and both are twisted by the ring type twister 121 and are then rolled up. Such variation for the draft ratio was achieved by changing the velocity of the front roller 120 which was, in turn, achieved by changing the signals from the register 24 as shown by FIG. 3 in connection with Embodiment 1, through the amplifier 105. Thus, a pattern nearly the same as the associated original was obtained. It is essential for the slub yarn that the slub arrangement present random characteristics in the woven state. This requirement is easily met according to the present invention since said slub arrangement may be checked in advance as was previously mentioned. This embodiment was conducted under the following conditions:

a. Spinning machine: HOWA High Speed Spinning Machine (manufactured by Howa Machinery Ltd.)
b. Sample: viscose rayon silver $3d \times 44$ mm; 0.36 g/m
c. Draft ratio: low ratio: 6 times; high ratio: 12 times
d. Delivery rate: 30 m/min

Embodiment 13

Figure 20:
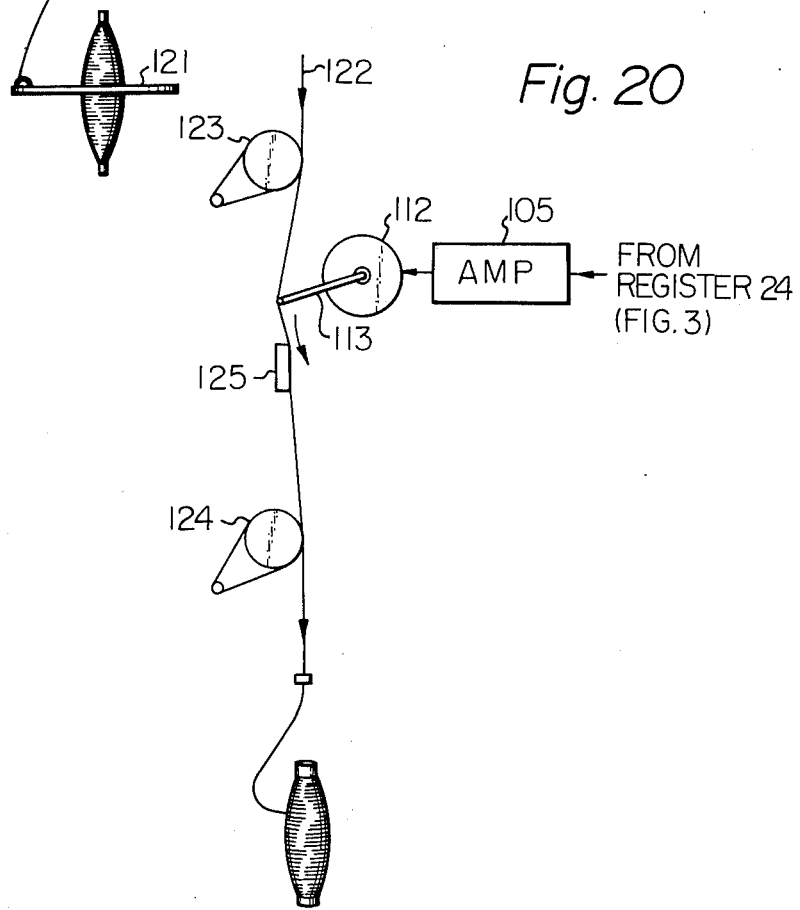
FIG. 20 is an embodiment wherein the present invention is applied to the manufacture of "thick and thin" yarn.

Signals from the register 24 shown in FIG. 3 in connection with Embodiment 1 were applied to the means shown in FIG. 20 to obtain thick-and-thin yarn.

Referring to FIG. 20, thermo-plastic non-drafted yarn 122 is continuously drafted between the feed roll 123 and the draft roll 124. During this operation, the signals from the register 24 shown in FIG. 3 causes the arm 113 mounted on the rotatable solenoid 112 to repeat its rotary movement alternately clockwise and counterclockwise, many times at an angle 20° and said arm 113 urges the travelling thermo-plastic non-drafted yarn 122 against the heat plate 125. Thus, the portion of yarn that was pressed against said heat plate 125 together with the portion that was not pressed against said heat plate 125 form the desired thick-and-thin yarn based on the difference in the drafting effect. This embodiment was conducted under the following conditions:

a. Thermo-plastic non-drafted yarn: polyester 75 d/36 f
b. Drafting velocity: 100 m/min
c. Draft ratio: 3.7
d. Temperature of heat plate: 160° C
e. Rotatable solenoid: Short-stroke DC Solenoid Model 60D (manufactured by Ushio Electric Inc.)

Embodiment 14

Bonding agent was applied on a pattern nearly the same as the original and this was then subjected to electrostatic treatment, hair planting, heat treatment, rinsing and soaping using the arrangement of Embodiment 8. Thus, the desired flock processed cloth was obtained. This embodiment was conducted under the following conditions:

a. Pile yarn: polyester 1.5 d $\times$ 5 mm
b. Drive: cloth feed pitch — 1 mm; nozzle feed pitch — 1 mm
c. Composition of electrodepositing agent for pile yarn:

| | | | |
|---|---|---|---|
| (a) | Pile yarn: | polyester 1.5 d × 5 mm | |
| (b) | Drive: | cloth feed pitch — 1 mm | |
| | | nozzle feed pitch — 1 mm | |
| (c) | Composition of electrodepositing agent for pile yarn: | | |
| | Leomine KP (prepared by Hoechst AG | | 20 g/l |
| | Colloidal Silica (prepared by Nissan Chemical Industries, Ltd.) | | 10 g/l |
| | sodium silicate | | 5 g/l |
| | acetic acid | | 2 g/l |
| | bath ratio | | 1 : 30 |
| (d) | Diameter of Nozzle: | 300 μ | |
| (e) | material of nozzle: | outer wall of stainless pipe being coated with Teflon | |
| (f) | Composition of bonding agent: | | |
| | Chlorinated Poly-propylene-chlorination degree of 45% (prepared by Sanyo Pulp Co., Ltd.) | | 10 |
| | methylethylketone | | 90 |
| | | Total: | 100 |
| (g) | Heat treatment: 120° C × 10 min | | |

Embodiment 15

Using the arrangement of Embodiment 8, a discharge dyeing agent was applied to knitted or woven goods containing acetate yarn fiber and was then subjected to steaming, soaping and rinsing. Thus, the desired discharge dyeing which does not have said acetate yarn fibre in accordance with a pattern nearly the same as to the associated original, was obtained. This embodiment was conducted under the following conditions:

| | | | |
|---|---|---|---|
| (a) | Driving mechanism: | cloth feed pitch — 0.5 mm | |
| | | nozzle feed pitch — 0.5 mm | |
| (b) | Sample: combined knit tricot using half 150d diacetate long fibre yarn and half 20d polypropylene long fibre yarn | | |
| (c) | Diameter of nozzle: 200 μ | | |
| (d) | Composition of discharge dyeing agent: | | |
| | alminium sulfate | | 20 parts |
| | water | | 80 parts |
| | | Total: | 100 parts |
| (e) | Steaming: 100° C × 30 min | | |

Embodiment 16

The paper tape obtained in embodiment 1 is, via the process shown in FIG. 8, code converted and supplied to an embroidery machine.

In this embodiment, the pattern caught by the television camera is digitalized and is stored in the computer as a combination of vertical X points and horizontal Y points. When the code signal referring to point A is X lines from the upper end of the X, Y plane and Y lines from the left end of said plane, this position is expressed as An (X, Y).

Figure 21:
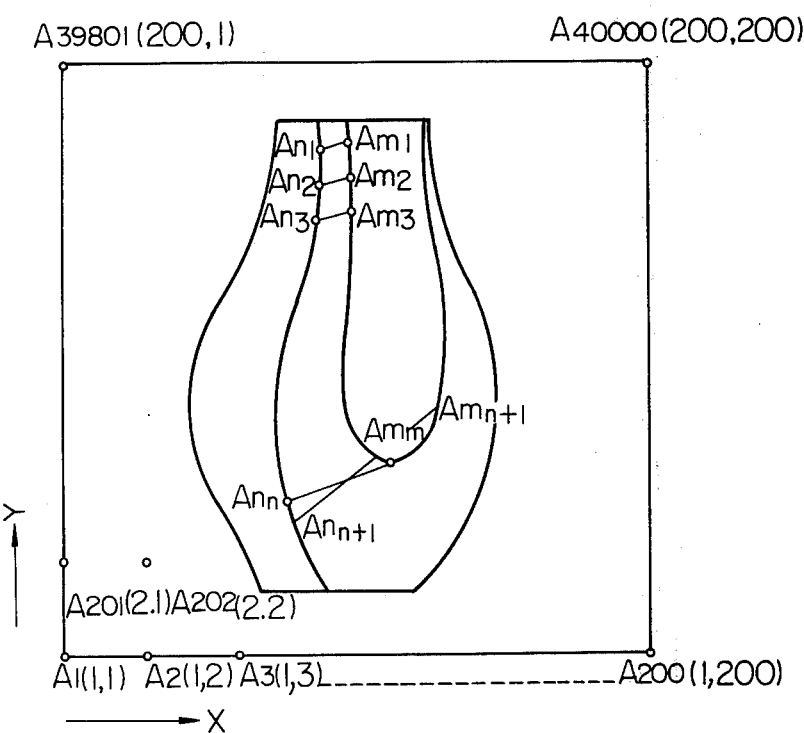
FIG. 21 is an embodiment wherein the present invention is applied to embroidery.

Next, we will explain how a desired point can be extracted from said combination of vertical and horizontal points. In FIG. 21, a group of combined points A1 (1,1), A2 (1,2), A3 (1,3) ... An (X, Y) ... A4000(200, 200) are shown by the television camera. The ranges where the points have the same density, are shown as A, B, C and D, as shown in FIG. 21. In the above-mentioned condition, firstly, we select two points An1, Am1 on the boundary lines where points having different densities are adjacent to each other. We next select two points An2, Am2 which are adjacent to said previously selected points An1, Am1, with the condition that the line An1, Am1 does not cross said line An2, Am2. When a line Ann, Amn is drawn across a line Ann+1, Amn+1 as shown in FIG. 21, we do not need to select any more points at Ann, Amn and we define said line Ann, Amn as the new boundary line and continue the above-mentioned selection. We can fill in the area having the same density, with embroidery thread. Actually, more detailed programs with reference to the above-mentioned operation, are required, since in the field of embroidery, the method for filling and arranging the thread affects to the artistic creation.

Therefore, it is desirable to provide many programs in accordance with various patterns. The effect of the present invention can be increased by selecting these programs by observing the graphic display unit.

Embodiment 17

The paper tape obtained in embodiment 1 is, via the process shown in FIG. 8, code converted and supplied to an embossing mechanism as shown in FIG. 22.

As shown in FIG. 23, many holes $a, a1, a2, \ldots, b, b1, b2, \ldots, c, c1, c2, \ldots$ are provided on the drum 126 the angle of revolution of which is controlled by a step motor or a pulse motor. The depth, size or form of these holes can be different corresponding to the object or its purpose. Holes having the same depth, size and form are arranged in the direction of the center axis of the drum 126. A heater 127 is provided in the drum 126 as shown in FIG. 24, in order to maintain a suitable temperature for said many holes.

Figure 24:
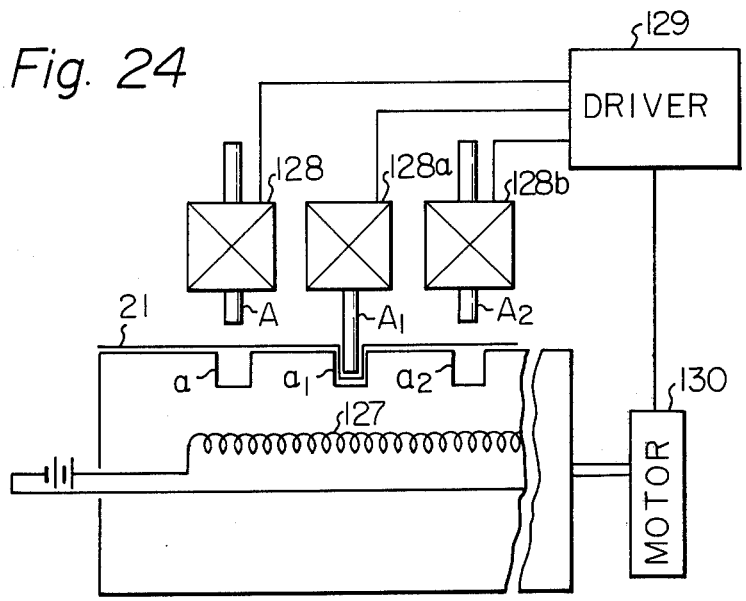

Further, as can also be seen in FIG. 24, projections A, A1, A2, . . . are provided corresponding, for example, to one series of holes $a, a1, a2, a3, \ldots$ and these projections A, A1, A2, . . . are pressed into said holes $a, a1, a2, a3, \ldots$ by actuating of electromagnetic solenoids 128, 128a, 128b, . . . Forementioned coded signals are supplied to the driver 129 which supplies the desired voltage to said electromagnetic solenoids corresponding to the number of extractions in the horizontal direction, at the same time, said driver 129 controls the motor which, in turn, controls the revolutions of said drum, in accordance with the degree of the density of the original figure which is indicated by two bits. These two controlling actions are both carried out by the driver 129. The above-mentioned converted signals are supplied to the working position on the fabric 89. When the working of one series of holes is completed, the feed roller 131 is shifted to the next working position, by a signal from said driver 129, and the process as mentioned above is effected on the fabric 89. Thus, the whole surface of the fabric 89 can be embossed.

Embodiment 18

Figure 25:
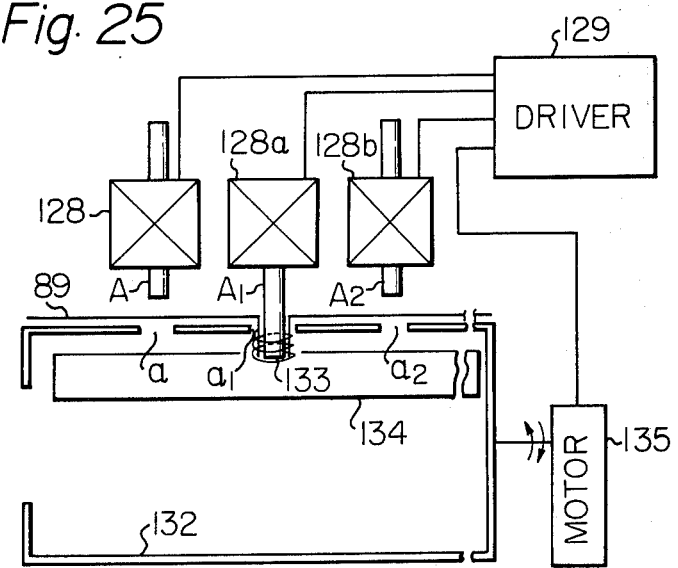
FIG. 25 is an embodiment wherein the present invention is applied to a squeeze finish.

The paper tape which is obtained in embodiment 1 is, via the process shown in FIG. 8, code converted and supplied to a binding mechanism as shown in FIG. 25.

As shown in FIG. 22, the fabric 89 is wound by the feed rollers 131 and 131a, and passes between a pattern plate 132 and the electromagnetic solenoids 128, 128a, 128b. In the mechanism shown in FIG. 25, the portion of the fabric 89 placed on the holes on the pattern plate 132 (for example, one of the sets of holes i.e. $a, a1, a2, \ldots, b, b1, b2, \ldots c, c1, c2,$) . . . is projected downwardly, by the electromagnetic solenoids 128, 128a, 128b, . . ., which pass through the holes ($a, a1, a2, \ldots, c1, c2, \ldots$). A binding mechanism 134 is provided for automatically binding a thread 133 to the projected portions A, A1, A2, . . . Driving signals; that is, 200 horizontal signals and 200 vertical signals, are supplied from the signal generator system to the binding mechanism 134. These signals are temporarily stored in the momory in said driver 129 which sends a signal concerning a first information representing a first horizontal line to the motor 135 in order to move the pattern plate so as to select the size of holes needed. Next, a signal is supplied from the driver 129 to the electromagnetic magnetic solenoids 128, 128a, 128b so as to project the fabric 89 which passes through the holes, and said signal is also supplied from the driver 129 to the binding mechanism 134.

Similar operations are repeated with respect to the second, the third . . . ., two hundredth information signal. The binding mechanisms 134 and the electromagnetic solenoids 128, 128a, 128b, . . . can be provided with the same number of holes. However, one binding mechanism 134 alone can be used by moving it, in order from hole to hole.

The fabric 89, which is obtained in the above-mentioned manner, is dyed, using a conventional method.

As has been mentioned before, the present invention can be applied to many fields. By using this method, the pattern design for the article can be simplified and the amount of labor needed for the pattern design can be considerably decreased. Further, by using this method, a novel method can be established in many fields of industry.

We claim:

1. A method for applying a pattern, corresponding to at least a portion of an object, to an article, said method forming basic pattern information which controls a machine for applying said pattern onto said article in accordance with a pattern information signal, comprising the steps of:
   a. generating a television signal corresponding to said object;
   b. generating a first electrical signal as a function of variations in said television signal resulting from at least one of the gradations, colors or irregularities in said object;
   c. displaying said first signal on a display device;
   d. generating a second electrical signal which can be displayed on said display device as at least one of a group of points or a group of boundary lines wherein the dimensions of the display of said second signal, horizontal to vertical ratio, the number of points and the position of the display of said second signal are independently variable;
   e. displaying said first and second signals on said display device in a superimposed relationship;
   f. varying said first signal and thus the display thereof, such that said first signal corresponds to at least a portion of said object;
   g. monitoring the variations of said first signal with said second signal superimposed thereon on said display device;
   h. generating a third electrical signal corresponding to said varied first signal at the points at which said second signal is superimposed thereon;
   i. applying said third signal to said machine for applying said pattern to said article for controlling said machine.

2. A method for applying a pattern to an article according to claim 1, wherein the output signal of said television signal is sliced at predetermined voltage levels, said sliced output voltages being converted into a plurality of independent signals and wherein said independent signals are combined to form a staircase image signal.

3. Method for applying a pattern to an article according to claim 1, further comprising the steps of
   a. storing said first electrical signal in a memory, and
   b. extracting portions of the image information in order, which portions are repeatedly reproduced from said memory.

4. A method for applying a pattern to an article according to claim 1, further comprising the steps of:
   a. storing said first or said third electrical signals in a memory, and
   b. extracting, in order, portions of said first or said third electrical signals said second electrical signal superimposed thereon.

5. A method for applying a pattern to an article according to claim 2, wherein the relative position between a television camera for generating said television signal and said object of said basic pattern is held constant until said third electrical signal is completely formed.

6. A method for applying a pattern to an article according to claim 1, further comprising the steps of:
   a. converting said first electrical signal into an analog signal which represents the image of said object, and
   b. converting said analog signal into a coded signal which corresponds to said analog signal.

7. A method for applying a pattern to an article according to claim 6, further comprising the steps of:
   a. converting said analog signals via independent voltage comparators into a group of shaped rectangular wave signals, and
   b. converting said rectangular wave signals into code signals.

8. A method for applying a pattern to an article according to claim 1,
   wherein generating said first signal comprises:
      generating an analog image signal (A) with a monochrome television camera in accordance with the gradations of light and dark of said object;
      storing said analog image signal (A) in a memory;
      repeatedly reproducing said analog image signals from said memory;
      converting said analog image signal via a plurality of voltage comparaters into a group of independent rectangular wave signals (B);
      combining said rectangular wave signals (B) into a signal (C) and displaying said signal (C) on a cathode ray tube;
   wherein generating said second signal comprises:
      forming a signal (D) for determining the pattern;
   and wherein generating said third signal comprises:
      generating a group of coded signals (E) from a group of said signals (B) which coincide to said signal (C) corresponding to said signal (D).

9. An apparatus for applying a pattern to an article, said apparatus forming a basic pattern signal in accordance with a pattern information of the original figure and controlling a knitting machine by said basic pattern signal, comprising:
   a. at least one television camera which is used for reading out said pattern information,
   b. display means for displaying thereon the output of said television camera,
   c. a plurality of Schmit trigger circuits which separate the electrical output signal of said television camera into the desired voltage levels and which convert the separated electrical signals into rectangular wave signals, each having a pulse width which is proportional to said voltage level,
   d. logical circuits which convert the plurality of said rectangular wave signals into coded signals,
   e. a synchronizing circuit which receives the output of said television camera and generates a synchronizing signal,
   f. an extract condition creation circuit which receives said synchronizing signal from said synchronizing circuit and extracts the coded signals which are within the desired range from a plurality of said coded signals,
   g. a mixer circuit which mixes the output of said extract condition creation circuit and said logical circuits, by using said synchronizing signal from said synchronizing circuit,
   h. display means which display the output of said mixer circuit, and
   i. a control means which controls said knitting machine in accordance with the output of said extract condition creation circuit.

10. An apparatus for applying a pattern to an article according to claim 9, wherein a magnetic disc is provided for temporarily storing the output signal of said television camera, and the output signal of said magnetic disc is supplied to a plurality of said Schmit trigger circuits.

11. An apparatus for applying a pattern to an article according to claim 9, wherein said extract condition creation circuit comprises:
   a. a first digital switch which determines the first position to be read out in the horizontal direction,
   b. a second digital switch which determines the last position to be read out in the horizontal director,
   c. a third digital switch which determines the pitch for extracting the information in the horizontal direction,
   d. a first flip-flop circuit which receives said horizontal synchronizing signal from said synchronizing circuit and, based on the values determined by said first and second digital switch, determines the range to be read out in the horizontal direction,
   e. a fourth digital switch which determines the first position to be read out in the vertical direction,
   f. a fifth digital switch which determines the last position to be read out in the vertical direction,
   g. a sixth digital switch which determines the pitch for extracting the information in the vertical direction,
   h. a second flip-flop circuit which receives the sunchronizing signal from said synchronizing circuit and, based on the values determined by said fourth and fifth digital switches, determines the range to be read in the vertical direction,
   i. a gate circuit which receives the outputs of said first and second flip-flops and the output of said third digital swithc and loads the output of said logical circuit, and
   j. a frame indicator ciruict which receives the outputs of said first, second, fourth and fifth digital switches and supplys the range of the coded signal to be extracted to said mixer circuit.

* * * * *